United States Patent
Bohnen et al.

(10) Patent No.: US 6,846,435 B1
(45) Date of Patent: Jan. 25, 2005

(54) METHOD FOR PRODUCTING METAL OXIDES DISPERSIBLES IN ORGANIC SOLVENTS

(75) Inventors: Frank Michael Bohnen, Osthofen (DE); Katja Siepen, Kuerten (DE); Paul K. Hurlburt, Leander, TX (US); Karen Reitz, Eddelak (DE)

(73) Assignee: Sasol Germany GmbH, Hamburg (DE)

( * ) Notice: Subject to any disclaimer, the term of this patent is extended or adjusted under 35 U.S.C. 154(b) by 0 days.

(21) Appl. No.: 10/030,066

(22) PCT Filed: Jul. 6, 2000

(86) PCT No.: PCT/DE00/02163
§ 371 (c)(1),
(2), (4) Date: May 17, 2002

(87) PCT Pub. No.: WO01/03824
PCT Pub. Date: Jan. 18, 2001

(30) Foreign Application Priority Data

Jul. 7, 1999 (DE) .......................... 199 31 204

(51) Int. Cl.$^7$ .............................. B01F 3/12; C08K 3/22; C01B 33/14
(52) U.S. Cl. ................... 252/363.5; 516/34; 524/35; 524/430; 524/444; 524/450
(58) Field of Search ................ 516/34, 100; 252/363.5; 524/35, 430, 444, 450

(56) References Cited

U.S. PATENT DOCUMENTS

| | | | |
|---|---|---|---|
| 3,018,172 A | 1/1962 | Tillman | 44/354 |
| 3,867,296 A | 2/1975 | Hunt | 516/22 |
| 4,076,638 A | 2/1978 | Redmore et al. | 516/93 |
| 4,123,231 A | 10/1978 | Guthrie et al. | 516/22 |
| 6,030,599 A | 2/2000 | Noweck et al. | 423/600 |
| 6,224,846 B1 * | 5/2001 | Hurlburt et al. | 516/100 |
| 6,262,132 B1 * | 7/2001 | Singleton et al. | 518/715 |

FOREIGN PATENT DOCUMENTS

| | | |
|---|---|---|
| AU | 200149 | 11/1955 |
| DE | 542803 | 12/1932 |
| DE | 1168588 | 4/1964 |
| DE | 4116522 | 11/1991 |
| DE | 4337643 | 8/1995 |
| EP | 0736491 | 8/1998 |
| GB | 277048 | 9/1927 |
| GB | 767958 | 2/1957 |
| GB | 872149 | 7/1961 |
| GB | 917947 | 2/1963 |
| GB | 1007172 | 10/1965 |
| JP | 60123560 | 7/1985 |
| JP | 06-032604 A * | 2/1994 |
| WO | WO 95/12547 | 5/1995 |

OTHER PUBLICATIONS

Machine translation of JP 06032604, Japan Patent Office, http://www6.ipdl.jpo.go.jp/Tokujitu/PAJdetail.ipdl?N0000=80&N0120=01&N2001=2&N3001=H06–032604, 4 pages (Sep. 2003).*
R. Nass and H. Schmidt, "Formation and Properties of Chelated Aluminum Oxides", The H. Hauser, et al., *Ceramic Powder Processing*, Deutsche Keramisde Gesellschaft, Kocta, pp. 69–76, Feb. 1999.

* cited by examiner

*Primary Examiner*—Daniel S. Metzmaier
(74) *Attorney, Agent, or Firm*—C. James Bushman; Browning Bushman P.C.

(57) ABSTRACT

The present invention relates to a process for preparing metal oxides or metal aquoxides, especially alumina hydrates which can be dispersed in organic solvents, and to sulfonic acid-modified metal oxides or metal aquoxides that can be prepared by this process.

21 Claims, 1 Drawing Sheet

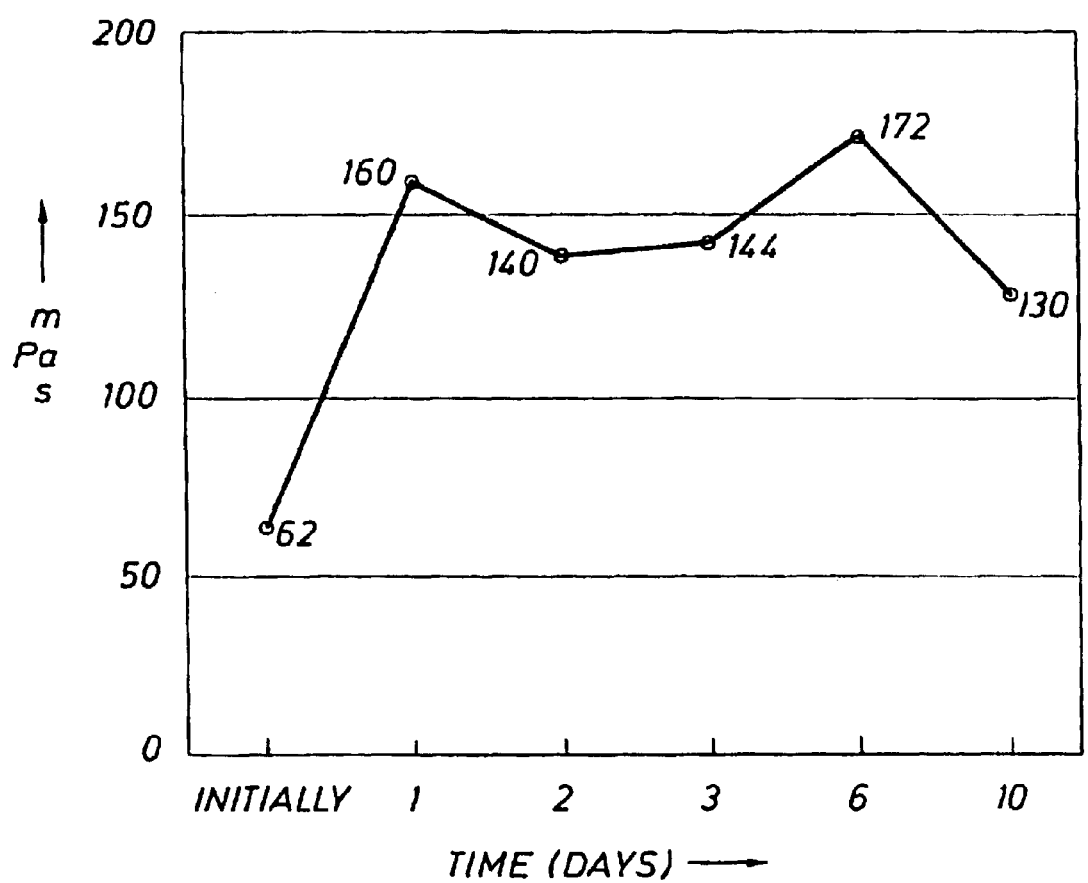

METHOD FOR PRODUCING METAL OXIDES DISPERSIBLES IN ORGANIC SOLVENTS

BACKGROUND OF THE INVENTION

1. Field of the Invention

This invention relates to a process for preparing metal oxides or metal aquoxides that are dispersible in organic solvents. The invention further relates to metal oxides or metal aquoxides that are modified with organic sulfonic acids and can be prepared by this process.

2. Description of the Prior Art

From WO 95/12547 or German patent DE 43 37 643-C1, a process is known for the preparation of nanocrystalline alumina hydrates in boehmitic or pseudoboehmitic form that are dispersible in water. Water-dispersible alumina hydrates can be obtained in this process by hydrolysis of aluminum alkoxides at temperatures from 30° C. to 110° C., addition of an acid (monovalent inorganic or organic acids as well as their anhydrides), and subsequent hydro-thermal aging. The resultant suspensions are suitable for example for coating materials, such as glass, metal, or plastics, as well as for producing high-strength catalyst supports, pure-phase mixed oxides, or after conversion to the α-form, for producing high-performance abrasives. The water-dispersibility of those alumina hydrates, which are not dispersible in organic solvents, is a disadvantage for certain applications, such as weather-resistant exterior coatings. For certain applications, aluminas that are dispersible in organic solvents but not in water are of interest.

The aluminas prepared by some of the processen known in the art are dispersible in dilute acids and water, and some of these aluminas are dispersible in short-chain alcohols, such as methanol and ethanol. They are not dispersible in organic aprotic solvents.

Colloidal alumina solutions in organic solvents are described for example in DE 41 16 522-C2 as well as by R. NaB and H. Schmidt ("Formation and Properties of Chelated Aluminum Alkoxides" in H. Hauener, G. Messing, S. Hirano (Eds.) "Ceramic Powder Processing", Deutsche Keramiache Geaellachaft, Cologne, 1969). According to said publication, the alumina hydrates obtained by hydrolysis of aluminum alkoxides in an organic solvent and in the presence of a β-diketone compound can occur as colloids in the solvent. However, the colloidal solutions described there are only (meta)stable in the organic solvent at high dilutions. Only for isopropanol as a solvent has it been experimentally proven that the solutions are in fact colloidal ones. Experiments have shown that after removal of the solvent, the colloidal particles prepared by said process cannot be redispersed.

From AU 200149 a process is known for the preparation of various inorganic oxides and hydroxides that can be dispersed in mineral oils. For this purpose, inorganic oxides or hydroxides are subjected to grinding in a ball mill in the presence of a surfactant and a mineral oil as the carrier fluid. As surfactants, organic sulfonic acids are cited among others. The surfactants are added to the composition in quantities of 0.5 to 3 wt. %.

In U.S. Pat. No. 3,018,172, a process is described for the preparation of aluminum hydroxides that are dispersible in non-polar, high-molecular organic solvents, such as mineral oils. In said process, aluminum alkoxides in a volatile organic solvent are hydrolyzed by contact with an organic sulfonic acid, such as postdodecylbenzenesulfonic acid in a viscous organic carrier fluid. After hydrolysis, the volatile organic solvent is removed and an aluminum hydroxide dispersed in a viscous organic carrier fluid, such as xylene, remains.

A similar process is described in U.S. Pat. No. 3,867,296, wherein a high-molecular organic sulfonic acid in a viscous organic carrier fluid is added to alumina hydrates in a volatile organic medium.

U.S. Pat. No. 4,076,638 and U.S. Pat. No. 4,123,231 describe variants of this process. According to U.S. Pat. No. 4,076,638, a carboxylic acid is used in parallel, while the viscous organic carrier fluid is dispensed with. According to U.S. Pat. No. 4,123,231, an aqueous mineral acid is used in addition to the organic sulfonic acid.

SUMMARY OF THE INVENTION

The processes described in the aforementioned U.S. patents have in common that substantial amounts of organic sulfonic acids must be used compared to the amount of alumina hydrate. In addition, organic solvents are required for the preparation of dispersible alumina.

According to AU 200149, mineral oxides are taken up in highly viscous mineral oils having a high solids content and then are dispersed in mineral spirits at high dilutions with a low solids content. However, these are no real colloidal solutions.

After drying, the products obtained by the aforesaid processes are no longer dispersible in organic solvents. It is the object of the present invention to provide dispersible metal oxides/metal aquoxides. It in a further object of this invention to provide a process for preparing such products, which does not have the disadvantages of the prior art and, for example, does not require organic solvents for their preparation. These problems are solved by the subject matter of the invention.

BRIEF DESCRIPTION OF THE DRAWINGS

The single FIGURE is a graph showing viscosity versus time (days) of an acetone dispersion.

DESCRIPTION OF THE PREFERRED EMBODIMENTS

The subject matter of the present invention is a process for preparing metal oxides or metal aquoxides, especially alumina hydrates that can be dispersed in protic or aprotic organic solvents. Said products can be obtained by reaction of (A) one or a plurality of metal oxide(s)/metal aquoxide(s) having a crystallite size of 4 to 100 nm, preferably 6 to 20 nm (determined by x-ray diffraction on the 021 reflex) and a particle size of less than 1,000 nm, preferably 5 to 500 nm, most preferably 20 to 100 nm (determined by photon correlation spectroscopy (PCS) in the suspension prior to drying, for example during the production process)

(B) one or a plurality of organic sulfonic acid(s), where
  (i) in case the reaction takes place in a largely aqueous medium or in the absence of a diluent, the organic sulfonic acid is a mono-, di-, or trialkylbenzene sulfonic acid, wherein the alkyl residue(s) is (are) $C_1$ to $C_6$ alkyl residues, preferably $C_1$ to C4 alkyl residues, and mono-$C_1$-alkylbenzene sulfonic acids or mono-$C_3$-alkylbenzene sulfonic acids are preferred, or ii) in case the reaction takes place in the presence of an organic aprotic solvent or an organic protic solvent, the organic sulfonic acid has at least 14 carbon atoms, preferably at least 16, and at least one aromatic ring, wherein the components (A), calculated as metal oxide, and (B) are used at weight ratios from 98:2 to 70:30, preferably from 95:5 to 80:20. Suitable organic protic solvents according to (ii) are for example alcohols, preferably $C_2$ to $C_4$ alcohols. Suitable aprotic solvents according to (ii) are for example aromatic hydrocarbons, such as toluene. In case the reaction in carried out in the presence of a largely aqueous medium, it is preferred that the organic sulfonic acid be soluble in the largely aqueous medium.

Preferred embodiments are the subject matter of the sub-claims.

The solvents used as dispersants according to the invention are:

(I) aprotic polar organic solvents (II) protic polar organic solvents having at least two carbon atoms, or (III) nonpolar organic solvents.

Suitable aprotic polar organic Solvents (I) include ketones, ethers, and esters, such as acetone, tetrahydrofuran (THF), methyl ethyl ketone, polyol eater, 1,6-hexanedioldiacrylate, and dimethylsulfoxide (DMSO).

Suitable protic polar organic, optionally high-molecular, solvents (II) having at least two carbon atoms include alcohols, polyethers (with at least one free hydroxy group), hydroxyalkyl esters, and hydroxyalkyl ketones, or carboxylic acids. Suitable alcohols include for example ethyleneglycol, $C_2$ to $C_8$ mono- or dihydroxy alcohols, such as propanols, butanols, pentanols and hexanols.

Suitable nonpolar organic solvents (III) are for example toluene and chlorobenzene.

The dispersible metal oxides or metal aquoxides obtainable by the process of the invention are powders that can be dispersed in the aforementioned solvents up to a solids content of 35 wt %. The particle size of the dispersed alumina hydrates is preferably from 20 to 1,000 nm (determined by PCS).

In a preferred embodiment of the present invention, the metal oxides or metal aquoxides, especially amorphous or nanocrystalline alumina hydrates (with crystallite sizes of up to 100 nm, measured on the 021 reflex, and grain sizes between 0.2 μm and 90 μm with particle sizes of 20 to 1,000 nm in the suspension) are mixed and stirred with 0.2 to 2 grams of p-toluenesulfonic acid monohydrate per gram of alumina or metal oxide or metal aquoxide, in each case calculated as metal oxide, at temperatures between 0 and 140° C. for a period from 30 to 180 minutes, and are dried by spray drying, freeze drying, drying in supercritical solvents, filtration, or rotary drum drying. The resultant powder retains little water dispersibility (<30 wt %) and is characterized by a very narrow grain size distribution. The powder can be easily dispersed in the aforementioned organic solvents with particle sizes from 10 to 1,000 nm, preferably from 10 to 500 nm (measured in the suspension).

Part of the suspensions obtained in this way are translucent. They produce transparent coatings, for example on films/foils, glass, or similar surfaces. As a result of their dispersibility in organic solvents, the aluminas modified in this way are suitable for incorporation into various water-insoluble polymers or lacquers/paints.

Most of the suspensions prepared in this way are opaque. They are characterized by excellent sedimentation and centrifugation stabilities. Hence, they are genuine colloidal solutions. Another peculiarity is their redispersibility, especially after drying, in organic solvents, and the possibility of making stable suspensions with a high solids content (>20 wt %). Surprisingly, the metal oxides/metal oxide hydrates obtained by the process of the present invention remain dispersible in the aforementioned dispersants (I) to (III), even after drying and, optionally, after finishing and/or storage.

In contrast to suspensions of alumina hydrates in aqueous systems, the viscosity increases only slightly at the beginning and then remains constant after one day (see FIG. 1/1). No sedimentation occurs, even not after several weeks. Owing to these properties, the p-toluenesulfonic acid-modified alumina hydrate of the invention is particularly easy to process and is most appropriate for making transparent coatings. Furthermore, it is useful as a filler in hydrophobic materials, such as PVC or lacquers/paints based on organic solvents.

Dispersions made from the modified metal oxides or metal aquoxides can with advantage contain at least one organic polymeric/oligomeric viscosity adjusting agent. Suitable such viscosity adjusting agents include cellulose, a cellulose derivative, a polyacrylate, a polyvinyl alcohol, and mixtures thereof.

The modified aluminas of the present invention can also be processed into molded articles by extrusion, pelletizing or spherical drop forming processes.

Dispersing Procedure

Into a beaker, there were placed 18 grams of solvent and, while stirring vigorously, 2 grams of modified alumina hydrate were added in portions into the vortex within 1 to 5 minutes. The mixture was stirred for additional 10 minutes. The resultant suspension had a solids content of 10 wt %. No sedimentation will occur with reality dispersible products. Dispersibility was determined by centrifugation of the suspension at 2,000 rpm (10 min), drying (at 120° C.), and weighing of the precipitate.

By the term 'dispersible metal oxides/metal aquoxides' employed herein especially those products are characterized which, when following the procedure described hereinbefore, remain in a dispersed state at >/=95 wt % or >/=98 wt %.

EXAMPLE 1

20 grams of water-dispersible nanocrystalline alumina hydrate (crystallite size measured on the 120 reflex: 8–12 nm) (CONDEA product Disperal™ S). corresponding to 14.4 grams of $Al_2O_3$, were dispersed in a solution of 4 grams of p-toluenesulfonic acid in 180 grams of demineralized water and heated to 90° C. for 30 minutes with stirring, thereby adjusting the pH-value to 1.5 and moderately thickening the suspension. After cooling, the suspension was spray dried (inlet temperature 240 to 270° C., outlet temperature <110° C.). A white odorless powder was obtained the properties and dispersibility of which are shown in Table 2 and Tables 1 and 4, respectively.

EXAMPLE 2
(PTBA-Modified Silica Alumina)

| Batch: | 180 grams of demineralized water<br>4 grams of p-toluenesulfonic acid (PTSA)<br>20 grams of Siral ™ 30 D |
|---|---|

A suspension of 20 grams of Siral™ 30 D was prepared in a solution of 4 grams of p-toluenesulfonic acrid in 180 grams of demineralized water. The resultant yellowish sol-like suspension was spray dried. The C-value after drying was 8.61%. The powder was redispersible at 99% in water and ethanol. After solvent exchange, it was redispersible in hexanol and ethylene glycol, too.

EXAMPLE 3

4 grams of postdodecylbenzenesulfonic acid (Marlon™ AS-3) were dissolved in 180 grams of toluene, 20 grams of Disperal™ S were added. The mixture was stirred at 80° C. for 30 minutes. The resultant yellowish sol with a solids content of approx. 10% contained aluminum oxide particles having a size of about 195 nm (measured by PCS). The sol was at 97.3% stable to centrifugation (10 minutes at 2,000 rpm). After removal of the solvent at 40° C./77 mbar, a yellowish crystalline powder was obtained which was redispersible in toluene, tetrahydrofuran (THF), butanol, methyl-tert-butyl ether (MTBE), and trichloromethane. In chlorobenzene, a translucent suspension can be obtained, which is not stable to centrifugation, however. The powder is 100% hydrophobic, i.e., dispersibility in water was reduced to 0% by reaction with Marlon™ AS-3. The organosols are characterized by their long-term stability to agglomeration. No increase in viscosity was observed after several days. The dispersibility of the powder is shown in Table 3.

TABLE 1

Dispersibility in Various Organic Solvents

| Solvent | Dispersibility (up to 10 wt % solids) | Particle Size [nm] | Transmission (0.1% solids) [%] | Remarks | Centrifugation Stability (2,000 rpm/ 10 min) [%] |
|---|---|---|---|---|---|
| Acetone | Yes (opaque) | 80 | 80.6% | With 20% solids: thixotropic | 94.2% |
| Ethanol | Yes | 100 | 84.5% | — | 99.0% |
| I-Propanol | Yes (limited) | — | | | Not determined |
| n-Butanol | Yes (opaque) | 97 | | | 99.5% |
| Hexanol | Yes | 335 | 65.8% | Thixotropic | 84.6% |
| Ethyleneglycol | Yes (opaque) | | | | |
| THF | Yes (opaque) | 121 | | | 96.5% |
| DMSO | Yes (opaque) | 104 | | | 95.0% |
| Chlorobenzene | By solvent exchange* (20% solids) | 400 | | Low viscosity | 99.5% |
| Dichloromethane | No | — | | | |
| Toluene | By solvent exchange* | PCS not possible | | Gelatinized | Not determined |
| 1,6-Hexanediol-diacrylate | By solvent exchange* | — | | Polymerized in UV | Not determined |

*At first dispersion in acetone, then addition of equal amounts of solvent (here: chlorobenzene), followed by displacement of the acetone by stirring with heating to 40° C.

TABLE 2

Physical Characteristics of the Powder

| | | 9.1 wt % PTSA | 16.8 wt % PTSA |
|---|---|---|---|
| Specific surface area (BET) (activated for 3 h at 250° C.) | [m²/g] | — | 135 |
| Pore volume (0–1,000 nm pore diameter) | [cm³/g] | — | 0.23 |
| Average pore radius | [nm] | — | 3.2 |
| $Al_2O_3$ content | [%] | — | 66 |
| C content | [%] | 3.8 | 6.5 |
| Particle size (dynamic laser scattering) | | $d_{10}$: 0.7 $d_{60}$: 2.2 $d_{80}$: 8.6 | $d_{10}$: 0.3 $d_{60}$: 1.2 $d_{80}$: 8.5 |

TABLE 3

Dispersibility of Disperal ™ S/ Marion ™ AS-3 In Various Solvents

| Solvent | Dispersibility [%] | Particle Size (PCS) [nm] | Transmission [%] |
|---|---|---|---|
| Toluene | 95.5 | 166 | 63.7 |
| THF | 99.0 | 113 | 32.3 |
| Butanol | 99.0 | 130 | 44.5 |
| MTBE | 85 | — | 6.8 |
| Trichloromethane | 98.5 | 64 | 42.3 |

TABLE 4

Dispersibility of Disperal ™ PTSA in Solvents Mixtures (10 wt % Solids)

| Solvent | Ratio | Particle Size (PCS) [nm] | Centifugation Stability (2,000 rpm/10 min) [%] |
|---|---|---|---|
| $CHCl_3$:MeOH | 90:10 | 90 | 98 |
| $CHCl_3$:MeOH | 70:30 | 70 | 97 |
| $CHCl_3$:MeOH | 50:50 | 80 | 97.5 |
| $CHCl_3$:MeOH | 30:70 | 107 | 97.5 |
| $CHCl_3$:MeOH | 10:90 | 70 | 98.5 |
| $CH_2Cl_2$:MeOH | 90:10 | 97 | 98 |
| $CH_2Cl_2$:MeOH | 70:30 | 109 | 96 |
| $CH_2Cl_2$:MeOH | 50:50 | 103 | 96.3 |
| $CH_2Cl_2$:MeOH | 30:70 | 97 | 98.5 |
| $CHCl_3$:Acetone | 70:30 | 148 | 84 |
| $CHCl_3$:Acetone | 50:50 | 52 | 97.5 |

What is claimed is:

1. A process for preparing modified metal oxides or metal aquoxides that are dispersible in organic solvents comprising:

(I) reacting at a temperature of above 0° C. and not exceeding 90° C.

(A) at least one metal oxide or metal aquoxide having a crystallite size of 4 to 100 nm, determined by x-ray diffraction on the 021 reflex, and a particle size of 5 to 500 nm, determined by photon correlation spectroscopy in dispersion; with (B) a modifier consisting essentially of at least one organic sulfonic acid wherein (i) in case the reaction takes place in a mainly aqueous medium or in the absence of a diluent/solvent, the organic sulfonic acid is a mono-, di-, or trialkylbenzene sulfonic acid, wherein the alkyl residue(s) are $C_1$ to $C_6$ alkyl residue(s) and wherein the component (A), calculated as metal oxide, and (B) are used at weight ratios from 98:2 to 70:30, or (ii) in case the reaction takes place in the presence of an organic aprotic solvent or an organic protic solvent, the organic sulfonic acid comprises at least 14 carbon atoms and at least one aromatic ring, and wherein the components (A), calculated as metal oxide, and (B) are used at weight ratios from 98:2 to 70:30, (II) drying the modified metal oxide or metal aquaoxide to produce a substantially non-water dispersible dried modified metal oxide or metal aquoxide; and (III) dispersing the dried modified metal oxide or metal aquoxide in a non-aqueous organic solvent.

2. The process according to claim 1, characterized in that said metal oxide or metal aquoxide contains aluminum.

3. The process according to claim 2 wherein said metal oxide or metal aquoxide are selected from the group consisting of aluminas, alumina hydrates, aluminum silicate, Si/Al mixed oxides and mixtures thereof.

4. The process according to claim 3 wherein said alumina hydrates are selected from the group consisting of boehmite, pseudoboehmite and mixtures thereof.

5. The process according to any one of claims 1–4, characterized in that the organic sulfonic acid is a toluenesulfonic acid.

6. The process according to claim 5 wherein said toluenesulfonic acid is p-toluenesulfonic acid.

7. The process according to any one of claims 1–4, characterized in that the organic sulfonic acid has the formula R—SO$_3$H, wherein R is an alkyl-substituted aromatic hydrocarbon residue with 16 to 24 carbon atoms.

8. The process according to any one of claims 1–4, characterized in that the metal oxides or metal aquoxides are brought into contact with the organic sulfonic acid for a period of time of from 30 seconds to 7 days.

9. The process according to claim 8 wherein the period of time is from 30 to 90 minutes.

10. The process of claim 8 conducted with stirring.

11. The process according to any one of claims 1–4, characterized in that the modified metal oxides or metal aquoxides are dried by spray drying, freeze drying, microwave drying, drying in supercritical solvents, filtration, contact drying, or rotary drum drying.

12. The process according to any one of claims 1–4, characterized in that the modified metal oxides or metal aquoxides are dispersed in organic solvent as dispersions having a solids content of 10 to 35 wt %.

13. The process according to claim 12 wherein the solids content is from 20 to 30 weight percent.

14. The process according to any one of claims 1–4, characterized in that the metal oxides or metal aquoxides are taken up in an organic solvent and this solvent is exchanged for a second solvent.

15. A metal oxide or metal aquoxide dispersion comprising a metal oxide or metal aquoxide according to any one of claims 1–4, and a dispersant selected from the group consisting of an aprotic polar organic solvent, a protic, polar organic solvent having at least two carbon atoms, an apolar organic solvent and mixtures thereof.

16. A dispersion according to claim 15 wherein the dispersion contains an additive comprising at least one organic polymeric/oligomeric viscosity-adjusting agent.

17. A dispersion according to claim 16 wherein the viscosity-adjusting agent is selected from the group consisting of cellulose, a cellulose derivative, a polyacrylate, a polyvinyl alcohol and mixtures thereof.

18. A dispersion according to claim 17, characterized in that the dispersant is selected from the group consisting of a solvent-based paint, lacquer, a water-insoluble plastic, and mixtures thereof.

19. A process according to any one of claims 1–4, characterized in that the modified metal oxides or metal aquoxides are processed into molded articles by extrusion, pelleting, or spherical drop forming processes.

20. The modified metal oxide or metal aquoxide prepared according to any of claims 1–4, dispersed in a hydrophobic material selected from the group consisting of polyvinyl chloride, laquer/paint based on organic solvents and mixtures thereof.

21. A transparent coating comprising a modified metal oxide or metal aquoxide prepared according to any one of claims 1–4 and a transparent coating agent.

* * * * *